(12) United States Patent
Royo et al.

(10) Patent No.: US 7,908,244 B2
(45) Date of Patent: Mar. 15, 2011

(54) LOCALIZED MEDIA CONTENT MANAGEMENT

(75) Inventors: José A. Royo, Venice, CA (US); Igor Vezmar, Venice, CA (US); Timothy B. Aron, Santa Monica, CA (US); Richard C. Fickle, Sedalia, CO (US)

(73) Assignee: Ascent Media Group, LLC, Santa Monica, CA (US)

( * ) Notice: Subject to any disclaimer, the term of this patent is extended or adjusted under 35 U.S.C. 154(b) by 204 days.

(21) Appl. No.: 11/217,256

(22) Filed: Aug. 31, 2005

(65) Prior Publication Data

US 2007/0050834 A1 Mar. 1, 2007

(51) Int. Cl.
G06F 7/00 (2006.01)
G06F 17/30 (2006.01)

(52) U.S. Cl. ......... 707/604; 707/791; 707/793; 725/105; 725/114

(58) Field of Classification Search ............. 707/999.01, 707/791, 793; 725/105, 114
See application file for complete search history.

(56) References Cited

U.S. PATENT DOCUMENTS

| | | | |
|---|---|---|---|
| 5,404,505 A * | 4/1995 | Levinson ........................ | 707/10 |
| 6,266,813 B1 * | 7/2001 | Ihara ................................ | 725/36 |
| 6,438,233 B1 * | 8/2002 | Yoshimune et al. .......... | 380/241 |
| 6,681,394 B1 * | 1/2004 | Fujita et al. ..................... | 725/32 |
| 6,747,706 B1 | 6/2004 | Geddes et al. | |
| 7,024,681 B1 * | 4/2006 | Fransman et al. ............. | 725/115 |
| 7,046,689 B2 * | 5/2006 | Burns et al. .................... | 370/429 |
| 7,191,461 B1 * | 3/2007 | Arsenault et al. .............. | 725/54 |
| 7,295,610 B2 * | 11/2007 | Schoenblum ............ | 375/240.03 |
| 2002/0138676 A1 * | 9/2002 | Kendall et al. .................. | 710/74 |
| 2002/0157104 A1 * | 10/2002 | Nakada et al. .................. | 725/97 |
| 2002/0194254 A1 * | 12/2002 | Shiga ............................ | 709/200 |
| 2003/0149988 A1 * | 8/2003 | Ellis et al. ....................... | 725/87 |
| 2004/0103120 A1 | 5/2004 | Fickle et al. | |
| 2004/0255335 A1 | 12/2004 | Fickle et al. | |
| 2005/0149501 A1 * | 7/2005 | Barrett .............................. | 707/3 |
| 2005/0196145 A1 * | 9/2005 | Nakamura ....................... | 386/94 |
| 2005/0265396 A1 * | 12/2005 | Steelberg et al. ............. | 370/486 |
| 2005/0273833 A1 * | 12/2005 | Soinio ........................... | 725/113 |
| 2006/0010470 A1 * | 1/2006 | Kurosaki et al. ................ | 725/46 |
| 2008/0037658 A1 * | 2/2008 | Price et al. ............... | 375/240.26 |

FOREIGN PATENT DOCUMENTS

| | | |
|---|---|---|
| EP | 1441534 A2 | 7/2004 |
| WO | 9930493 A | 6/1999 |
| WO | 03100656 A1 | 12/2003 |

OTHER PUBLICATIONS

Performance Archive and Retrieval Working Group: "Current Practices in Digital Asset Management" Internet Citation, [ONLINE], Oct. 31, 2003 (http://arts.internet2.edu).

* cited by examiner

*Primary Examiner* — Jay A Morrison
(74) *Attorney, Agent, or Firm* — Blakely Sokoloff Taylor & Zafman LLP (57) ABSTRACT

An embodiment of the present invention is a technique to localize content management of media content assets. A local content is received at a regional media center. The local content corresponds to an event localized within a locality. The local content is prepared into an asset using a media content management system. An asset package containing the asset is propagated to a head-end for distribution to a subscriber in the locality.

In another embodiment of the invention, an asset package containing an asset and asset attributes is received from a propagation unit. The asset is created from a local content corresponding to an event localized within a locality. The asset is distributed to a subscriber in the locality.

30 Claims, 10 Drawing Sheets

LOCALIZED MEDIA CONTENT MANAGEMENT

BACKGROUND

1. Field of the Invention

Embodiments of the invention relate to the field of multimedia distribution, and more specifically, to localized media content distribution.

2. Description of Related Art

Media content services are increasingly popular in the entertainment and broadcast industry. Examples of these media content services include media distribution, advertisements, and video-on-demand (VOD) distribution. In a typical media content distribution system, content programmers or providers prepare content such as movies, television shows, multimedia features, etc. and transmit the content to cable operators. The cable operators or multiple services/systems operators (MSOs) then ingest the content into a content server. The content server then streams or makes the content available to customers or subscribers of the MSO upon demand by the customers.

One important market area for media content services is the delivery or distribution of local content. Local content includes features that are related to a local or regional area or community. Examples of these features may include local news, local sports events, local advertisements, etc. Existing media content systems do not efficiently support local content distribution. The current offerings are high-cost due to deploying non-distributed content preparation and management solutions. These solutions are inefficient and difficult to implement. Each head-end may require increased staffing and expertise to support local content distribution.

BRIEF DESCRIPTION OF THE DRAWINGS

Embodiments of invention may best be understood by referring to the following description and accompanying drawings that are used to illustrate embodiments of the invention. In the drawings.

DESCRIPTION

An embodiment of the present invention is a technique to localize content management of media assets. A local content is received at a regional media center. The local content corresponds to an event, activity, or service localized within a locality. The local content is prepared into an asset using a media content management system. An asset package containing the asset is propagated to a head-end or multiple head-ends for distribution to a subscriber or subscribers in the corresponding locality. In another embodiment of the invention, an asset package containing an asset and asset attributes is received from a propagation unit. The asset is created from a local content corresponding to an event, activity, or service localized within a locality. The asset is distributed to a subscriber or subscribers in the corresponding locality.

In the following description, numerous specific details are set forth. However, it is understood that embodiments of the invention may be practiced without these specific details. In other instances, well-known circuits, structures, and techniques have not been shown to avoid obscuring the understanding of this description.

One embodiment of the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a program, a procedure, etc.

One embodiment of the invention is a technique to provide efficient and cost-effective localized content management. The local content deployment is distributed and managed at the local or regional level. By implementing the solution at a regional center, significant cost savings may be achieved across the entire MSO. In addition, the solution offered by one embodiment of the invention may present opportunities for new revenues and business models as local content is now being introduced for consumption (e.g., purchase, sponsorship, advertisement). The solution is also scalable because it is supported by an intelligent caching staging appliance that may manage some or all of the media content management tasks. One key aspect of one embodiment of the invention is that the local nodes may be bi-directional in that they may both receive and send the content. Other aspects or features of embodiments of the invention include flexibility, adaptability, and versatility. Any content may be localized within the system. The technique may be adapted for a variety of applications such as VOD services, advertisement insertion, and media broadband distribution.

Elements of embodiments of the invention may be implemented by hardware, firmware, software or any combination thereof. The term hardware generally refers to an element having a physical structure such as electronic, electromagnetic, optical, electro-optical, mechanical, electro-mechanical parts, components, or devices, etc. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc., that is implemented or embodied in a hardware structure (e.g., flash memory). Examples of firmware may include microcode, writable control store, micro-programmed structure. When implemented in software or firmware, the elements of an embodiment of the present invention are essentially the code segments to perform the necessary tasks. The software/firmware may include the actual code to carry out the operations described in one embodiment of the invention, or code that emulates or simulates the operations.

The program or code segments can be stored in a processor or machine accessible medium or transmitted by a computer data signal embodied in a carrier wave, or a signal modulated by a carrier, over a transmission medium. The "processor readable or accessible medium" or "machine readable or accessible medium" may include any medium that can store, transmit, or transfer information. Examples of the processor readable or machine accessible medium include an electronic circuit, a semiconductor memory device, a read only memory (ROM), a flash memory, an erasable ROM (EROM), an erasable programmable ROM (EPROM), a floppy diskette, a compact disk (CD) ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc. The machine accessible medium may be embodied in an article of manufacture. The machine accessible medium may include data that, when accessed by a machine, cause the machine to perform the operations described in the following. The machine accessible medium may also include program code embedded therein. The program code may include machine readable code to perform the operations described in the following. The term "data" here refers to any type of information that is encoded for machine-readable purposes. Therefore, it may include program, code, data, file, etc.

All or part of an embodiment of the invention may be implemented by hardware, software, or firmware, or any combination thereof. The hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

One embodiment of the invention may be described as a process, which is usually depicted as a flowchart, a flow diagram, a structure diagram, or a block diagram. Although a flowchart may describe the operations as a sequential process, many of the operations can be performed in parallel or concurrently. A loop or iterations in a flowchart may be described by a single iteration. It is understood that a loop index or loop indices or counter or counters are maintained to update the associated counters or pointers. In addition, the order of the operations may be rearranged. A process terminates when its operations are completed. A process may correspond to a method, a program, a procedure, etc. A block diagram may contain blocks or modules that describe an element, an item, a component, a device, a unit, a subunit, a structure, a method, a process, a function, an operation, a functionality, or a task, etc. A functionality or an operation may be performed automatically or manually.

Figure 1:
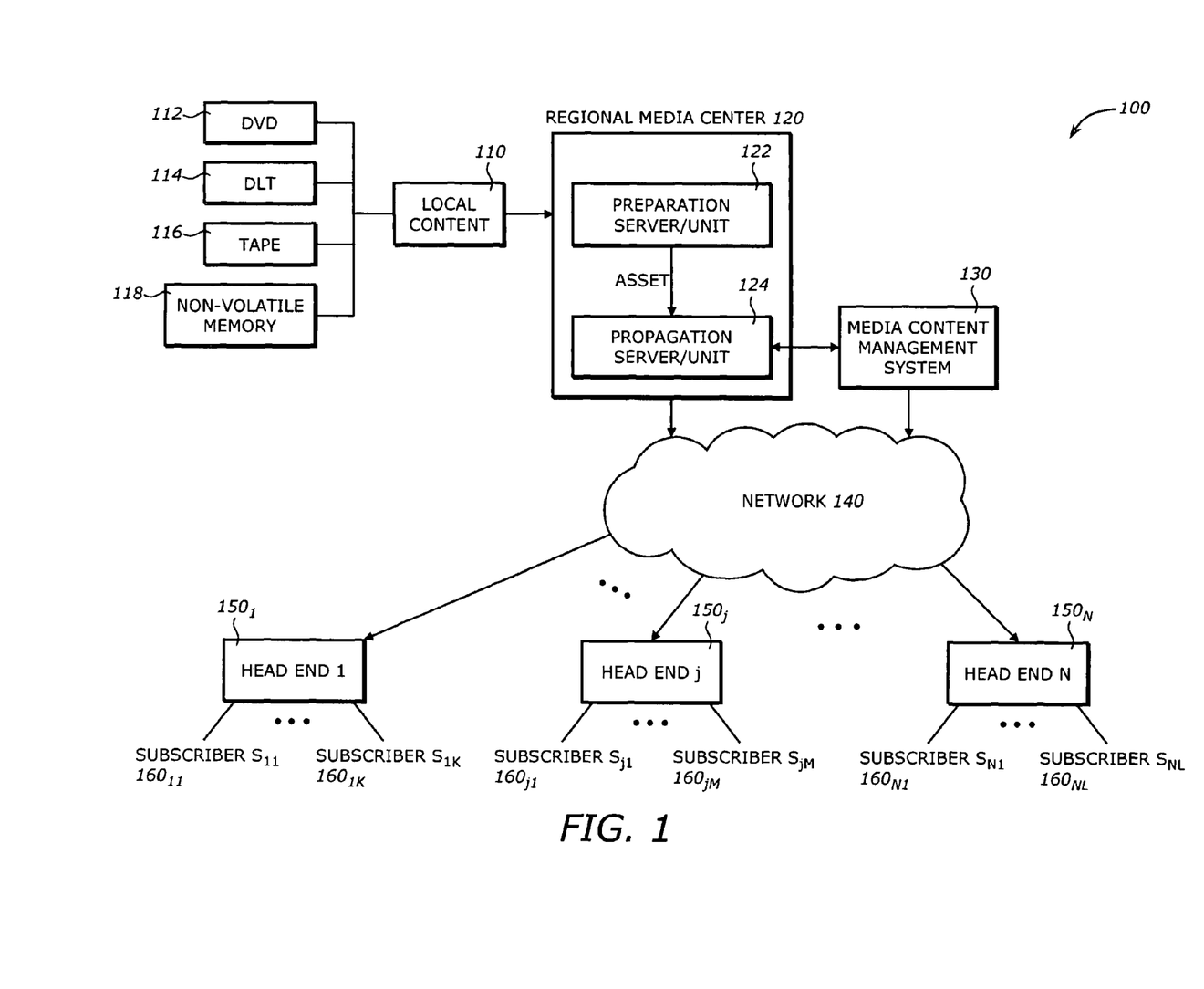
FIG. 1 is a diagram illustrating a system in which one embodiment of the invention can be practiced.

FIG. 1 is a diagram illustrating a system 100 in which one embodiment of the invention can be practiced. The system 100 includes a local content 110, a regional media center 120, a media content management system (MCMS) 130, a network 140, N head-ends $150_1$ to $150_N$, and a number of subscribers $160_{jk}$'s.

The local content corresponds to an event, activity, or service localized within a locality. The content may be a multimedia content, a feature, an audiovisual presentation, a movie, a television show, a radio program, a video segment, a program, an advertisement segment, or any other type of multimedia presentation. The event, activity, or service may be any event, activity, or service of interest to the locality. It may be a local news, a sports event, a local weather program, an educational program, a local show, a town meeting, a school board meeting, a community meeting, a county fair, a local concert, a commercial for local businesses, an advertisement, a promotional event, or any local event or activity that a MSO wants to provide a media content service to its customers or subscribers. The locality may be any geographical region served by an MSO such as a metropolitan area, a community, etc. The local content may be embedded in any medium. It may be in any suitable format such as analog, digital, optical, etc. It may be partially or fully encoded or not encoded at all. It may be contained in a tape, a cartridge, a digital versatile disk (DVD), a digital linear tape (DLT), digital audio tape (DAT), compact disk read only memory (CDROM), or any non-volatile storage such as analog, digital, or optical storage.

The regional media center (RMC) 120 is a facility that is designed to service a regional targeted market. It may be a regular head-end that acts as a regional center. It may include hardware and software components and staff, technicians, and skilled personnel to provide the management of media content services. It may include a preparation server or unit 122 and a propagation server or unit 124. The preparation server/unit 122 and propagation server/unit 124 may be two separated components or integrated into one single server or unit. The RMC 120 receives the local content 110 and prepares it for delivery to any one of the head-ends $150_1$ to $150_N$. It may interact with the MCMS 130 during the preparation and propagation of the local content 110. By distributing the management of asset management of local content regionally at the RMC 120, significant cost savings may be achieved. For example, the hardware and software costs and staff at the head-ends $150_1$ to $150_N$ may be reduced.

The MCMS 130 may perform the creation, delivery, scheduling, tracking, distribution, ingestion and validation, cataloging, archiving, and any other functions related to the management of various contents and assets. The MCMS 130 may include various interfaces to content providers and/or MSOs to receive metadata of various formats, track multimedia asset data files, transmit related metadata, enter and manage scheduling and business rules (e.g., ratings filters, pricing rules, category rules, electronic program data), view and analyze metadata and scheduling information, analyze usage data for advertisement, features, episodic programming, control/enable content marketing, etc. In particular, the MCMS 130 provides metadata ingestion to the local content and scheduling for delivery to the head-ends $150_1$ to $150_N$, and management of the content ingestion into a content server (e.g., VOD server). The RMC 120 may be integrated with the MCMS 130 via an application program interface (API)-based integration. Web services API and control over the integration design and implementation may also be available. The MCMS 130 may be a video-on-demand management system, a broadband distribution management system, or any other content management system for media delivery or distribution.

The network 140 may be any network for transmission of information or signal. It may be a local area network, a wide area network, the Internet, a wireless network such as wireless fidelity (Wi-Fi), hotspot, Bluetooth, or a combination of wired and wireless networks. It may include any one of Internet Protocol (IP), IP over Asynchronous Transfer Mode (ATM), Gigabit Ethernet, fiber optics, Synchronous Optical Network (SONET), satellite, or cable networks.

The head-ends $150_1$ to $150_N$ may be any head-ends designed for content delivery or distribution. Any one of the head-ends $150_1$ to $150_N$ may include edge servers or video servers. They may include redundant array of inexpensive disks (RAIDs) servers. They may have a variety of stream processing functionalities such as video encoding of uncompressed video and/or audio, video multiplexing, format conversion such as conversion from Motion Picture Expert Group (MPEG)-2 to MPEG-4, etc. They may have interface to Gigabit Ethernet or ATM for delivery over broadband environment. They may also have interface to Digital Subscriber Loop (DSL) such as xDSL or fiber transmission. In particular, each of the head-ends $150_1$ to $150_N$ may include an edge server or catcher to receive the local content or assets delivered from the RMC 120. They may have interface to the MCMS 130.

The subscribers $160_{jk}$'s are the subscribers to receive the media content services. They may be consumers living in the locality and customers of MSO's. They may also be any local businesses or commercial entities. They may have appropriate receiving equipment and associated network connections to receive the asset for viewing such as satellite receivers, cable receiver, xDSL modem, set-top boxes, etc.

Figure 2:
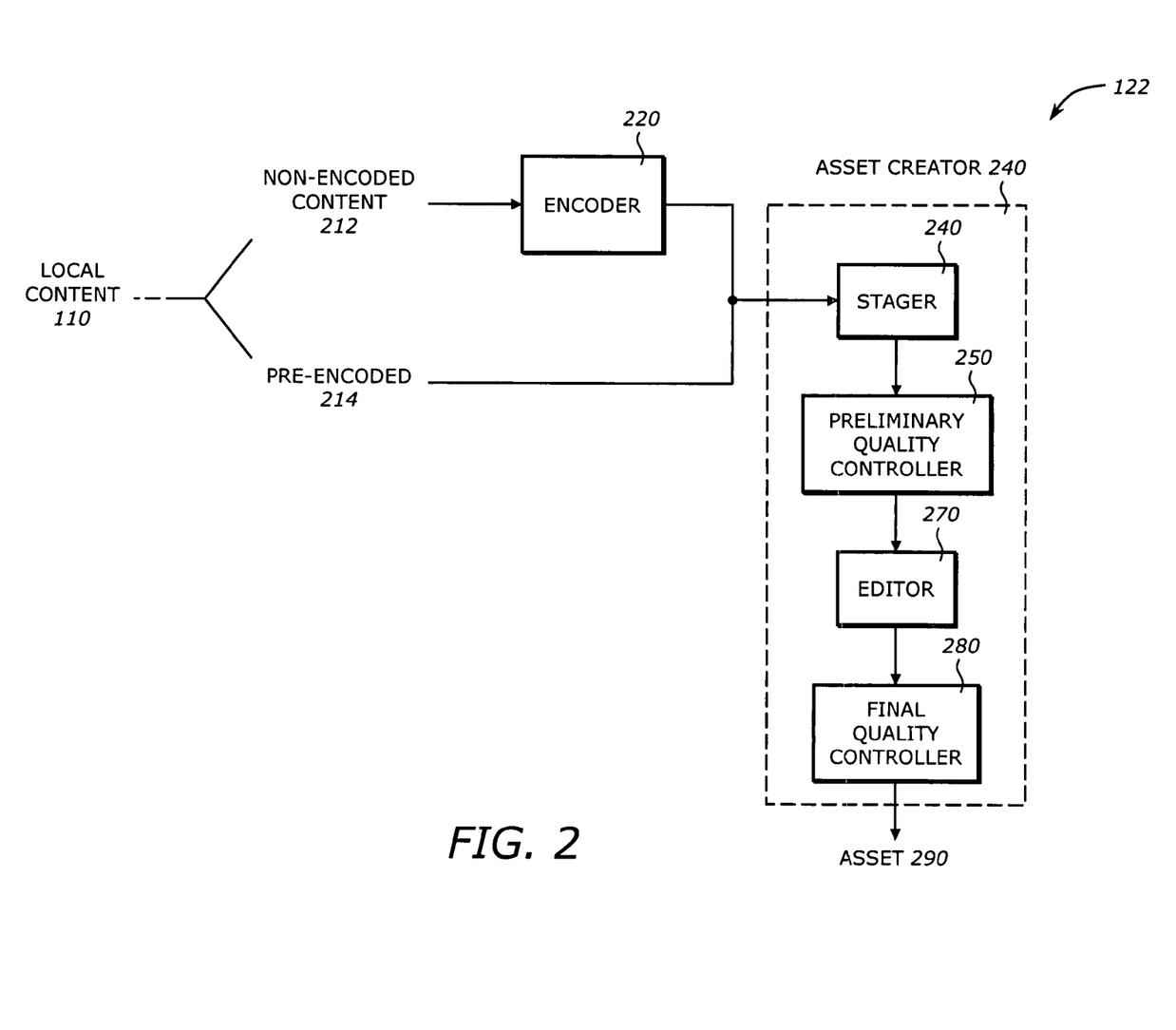
FIG. 2 is a diagram illustrating an encoding unit according to one embodiment of the invention.

FIG. 2 is a diagram illustrating the preparation server/unit 122 shown in FIG. 1 according to one embodiment of the invention. The preparation server/unit 122 includes an encoder 220 and an asset creator 230. It is noted that the preparation server/unit 122 may contain more or less components than the above.

The local content 110 may be a non-encoded content 212 or a pre-encoded content 214. The encoder 220 encodes the non-encoded content 212. The pre-encoded content 214 may go directly to the asset creator 230. The pre-encoded content may be received by the preparation server/unit 122 via file transfer protocol (FTP) or satellite transmission. The encoder 220 may perform a number of encoding tasks on the non-encoded content 212, including video and audio compression. It may perform Dolby Audio Compression (AC)-3 audio encoding. It may generate Motion Picture Experts Group (MPEG)-2, MPEG-4 files, Trick Play files for Fast Forward and Rewind, Playback functions, or pre-mastering. It may also generate Extensible Markup Language (XML)-based automation interface for integration with content management systems. The encoder 220 may work with any format such as MPEG-1, MPEG-2, MPEG-4, high definition television (HDTV), standard definition, television (SDTV), and broadband formats such as Microsoft Windows Media and Real Networks.

The asset creator 230 creates an asset from the local content 212 or 214. An asset is a digital file created from a local content that may contain additional information or data associated with the local content that may be useful for processing and management. It may contain inserted advertisements, overlays, effects, etc. Local advertisements may be inserted in a broadband service and propagated along the system to be distributed together with the asset to subscribers in the locality. An asset may be repurposed again across multiple platforms and formats. The asset creator 230 includes a stager 240, a preliminary quality controller 250, a media analyzer 260, an editor 270, and a final quality controller 280. Each of these elements may be a functionality performed automatically by machine or manually by human.

The stager 240 stages the local content for quality control and edit. This may include installing the local content in appropriate access device such as loading a tape into a video tape recorder (VTR) or inserting a DVD into a DVD player or editing workstation. The preliminary quality controller 250 performs preliminary quality control on the local content. This may include analysis and checking of media attributes or quality of the local content. The media attributes may include MPEG, video, or audio. The editor 270 edits the local content. The editing may include generation of titles, description, annotations, or texts; inserting advertisements or commercials, graphic overlays; trimming; three-dimensional (3-D) graphic animation; and other editing functions such as deletions, cuts, dissolves, transitions, video and audio effects, etc. The final quality controller 280 performs a final quality control on the edited local content to produce an asset 290.

Figure 3:
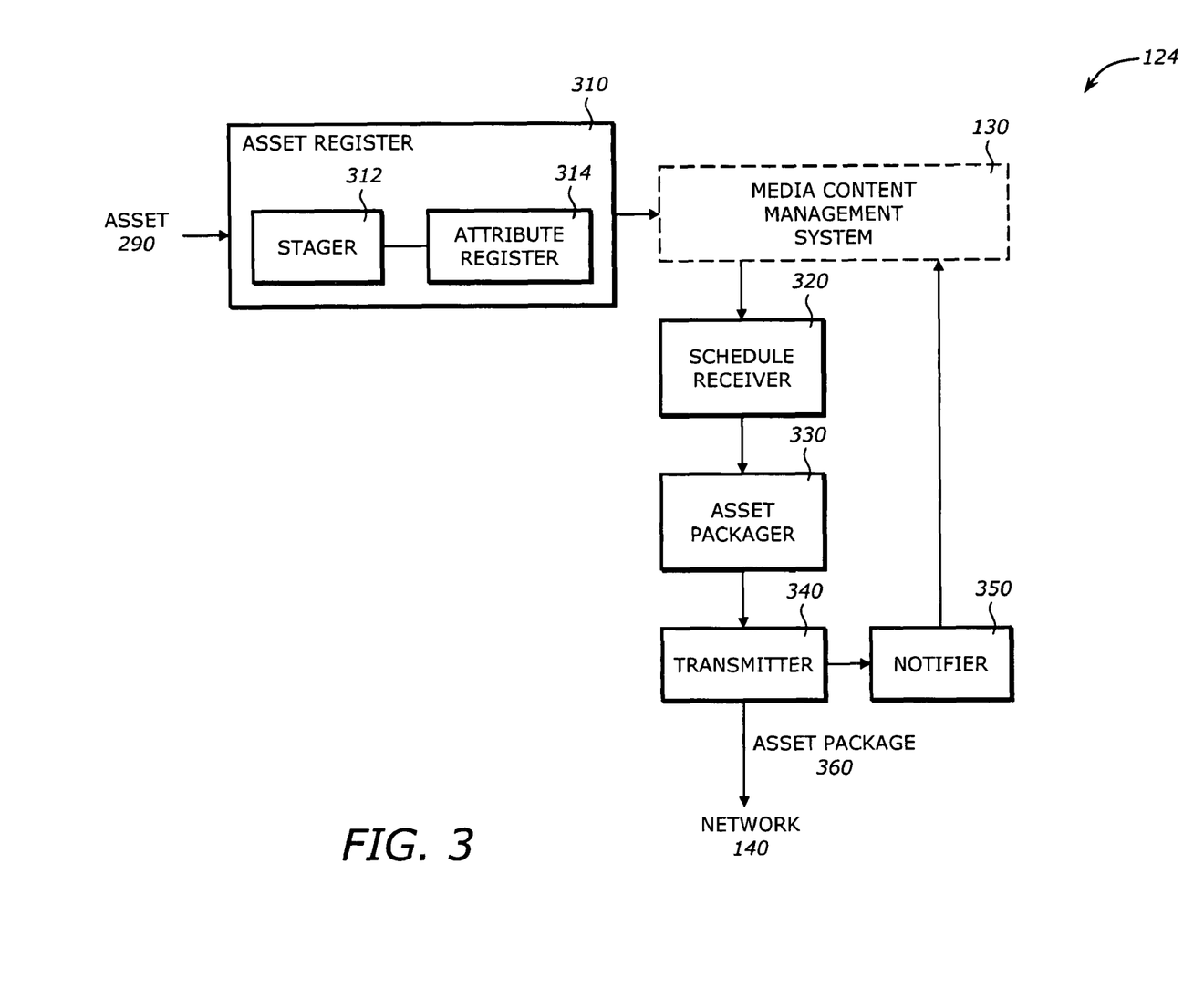
FIG. 3 is a diagram illustrating a propagation unit according to one embodiment of the invention.

FIG. 3 is a diagram illustrating a propagation server/unit 124 according to one embodiment of the invention. The propagation server/unit 124 includes an asset registers 310, a schedule receiver 320, an asset packager 330, a transmitter 340, and a notifier 350. It is noted that the propagation server/unit 124 may contain more or less components than the above. The propagation server/unit 124 provides bi-directional solution for local content delivery or distribution. It may stage assets, receive schedule, propagate assets, and also receive the local content or assets.

The asset register 310 registers the asset with the media content management system 130. It includes a stager 312 and an attribute register 314. The stager 312 stages the asset for registering. This may include installing the asset in an appropriate device, equipment, or interface for registering. The attribute register 314 registers asset attributes with the media content management system 130. The asset attributes include at least one of a file size, a file name, an error checking information (e.g., checksum), and an asset identifier. The MCMS 130 may assign a globally unique identifier to the asset for use throughout the propagation and delivery process.

The schedule receiver 320 obtains or receives a propagation schedule from the MCMS 130. The propagation schedule may contain timing information for asset delivery such as a specific period or time slot in a day or days, delivery or distribution locations, and associated priorities. The locations may be individual locations, groups of locations, or all locations. The schedule receiver 320 may sort out the schedule information and manage the queue that contains the delivery/distribution information based on business rules and the appropriate metadata. The schedule receiver 320 may forward the propagation schedule to the transmitter 340 for delivery.

The asset packager 330 packages the asset with asset attributes (e.g., file size, file name, error checking information, asset identifier) and other relevant information into an asset package 360. This operation may be optional since the asset attributes may be managed and/or delivered via the MCMS 130. The asset packager 330 may also perform encryption on the asset using a suitable encryption key if such security measure is necessary.

The transmitter 340 transmits the asset package 360 containing the asset to any one of the head-ends $150_1$ to $150_N$ according to the propagation schedule. The transmission may be unicast (point-to-point) or multicast (point-to-many-points) utilizing store-and-forward technologies. The transmission may use any communication means or protocols between the RMC 120 and the head-ends $150_1$ to $150_N$ including IP, IP over ATM, file transfer protocol (FTP) transmission, multi-source FTP (MFTP) transmission, Gigabit Ethernet, satellite and terrestrial transmissions to one or multiple destinations, etc. The transmitter 340 may be any suitable server or unit to carry out the transmission, such as a FTP server. The transmission may be serial for each propagation schedule. The transmitter 340 may use any suitable digital content delivery package to facilitate the transfer. The transmitter 340 may also use additional hardware, software, or firmware to facilitate the transfer.

The notifier 350 notifies the MCMS 130 of a transmission status of the asset package. If the transmission is not successful, the transmitter 340 re-transmits the asset package until successful or until a maximum number of retries has been attempted. The transmitter 340 may also re-transmit lost packets or packages only and ensure reliable transmission using file-based forward error correction algorithms. If a maximum number of retries has been attempted without success, an alarm condition may be generated to inform responsible personnel. The MCMS 130 may then perform other tasks or functions to ensure the asset package is transmitted to the requesting subscriber or subscribers at the appropriate time.

Figure 4:
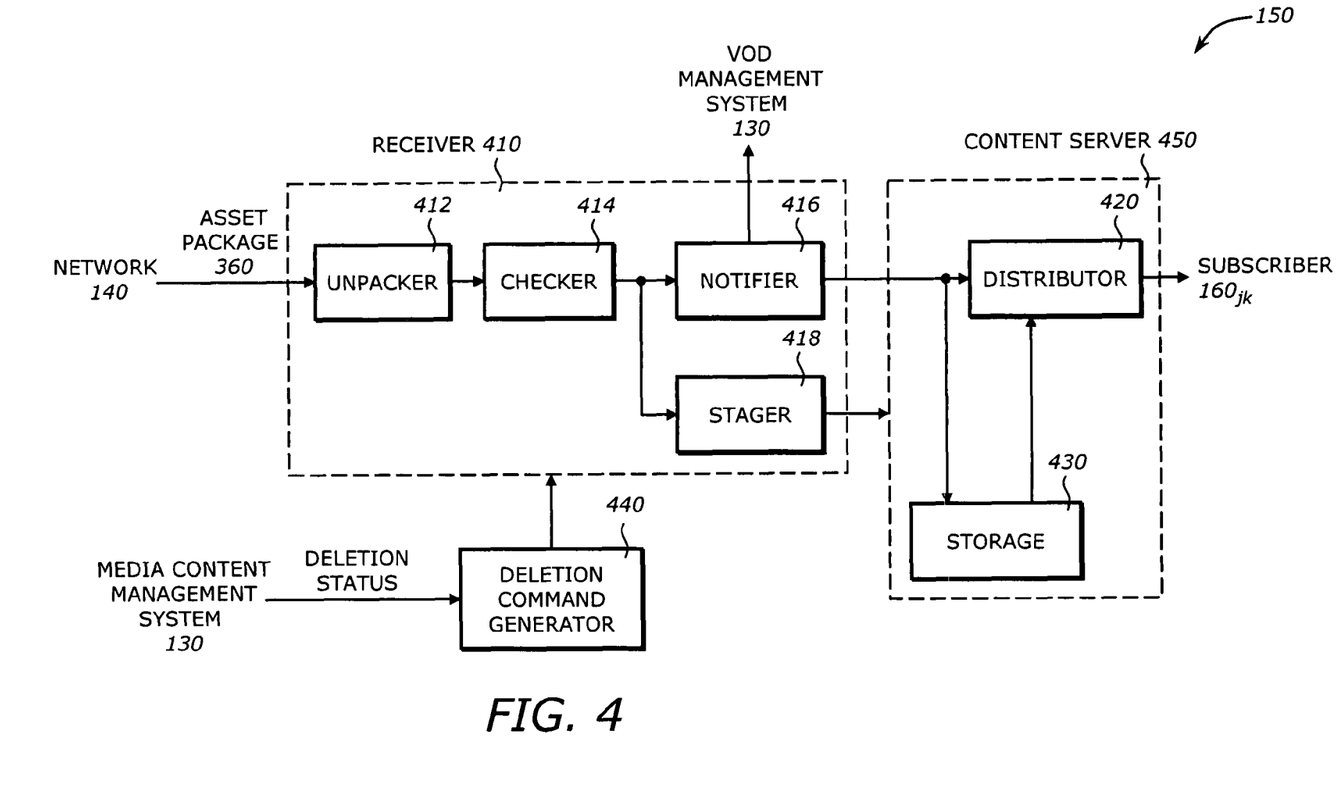
FIG. 4 is a diagram illustrating a head-end according to one embodiment of the invention.

FIG. 4 is a diagram illustrating a head-end 150 according to one embodiment of the invention. The head-end 150 may represent any one of the head-ends $150_1$ to $150_N$ shown in FIG. 1. The head-end 150 may include an edge server and/or a content (e.g., video) server interfaced to the network 140. It includes a receiver 410, a deletion command generator 440, and a content server 450. The head-end 150 may include other components (not shown) for fast and efficient asset delivery such as Quadrature Amplitude Modulation (QAM) modulators, synchronous optical network (SONET) multiplexers, switches and routers, high-speed digital transport devices such as hybrid fiber-coax (HFC), analog and digital Dense Wavelength Division Multiplexing (DWDM), Digital Network Control System (DNCS) such as those manufactured by Motorola and Scientific Atlanta, etc. It is noted that the head-end 150 may contain more or less components than the above.

The receiver 410 receives the asset package 360 containing the asset 290 and asset attributes from a propagation server via the network 140. The asset 290 is created from the local content 110. The receiver 410 may use any suitable digital content delivery and reception package to facilitate the reception. The receiver 410 includes an unpacker 412, a checker 414, a notifier 416, and a stager 418. The unpacker 412 unpacks or disassembles the asset package 360 to extract the asset attributes if necessary. When the assets are distributed without associated attributes, the unpacker 412 may not be necessary and it may simply pass the asset to the next phase. It may also perform decryption on the asset using a suitable key if the asset is encrypted for security purposes. The checker 414 determines the integrity of the asset package 360 to ensure that the asset package 360 is received without error. The checker 414 may check the file size and the error checking information. The notifier 416 notifies the MCMS 130 of a receipt status of the asset package 360. If there is an error or problem with the asset package 360, the notifier 416 also notifies the MCMS of the problem so that the MCMS 130 may request a re-transmission. The transmitter 340 in the propagation server 124 may then re-transmit the asset package 360 until it is received successfully by the receiver 410, or it may request the lost information. Upon a successful receipt, the receiver 410 may upload the asset package to the content server 450 using the stager 418. The stager 418 is a file system that stages the asset to ingest or upload to the content server 450 for processing, storage, and distribution to subscribers in the locality.

The content server 450 may be part of the head-end 150, or may be separated from it. It may include a distributor 420 and a storage 430. It may be a video server that process video content such as VOD or broadband services. The distributor 420 distributes, delivers, or transmits the asset to the subscriber $160_{jk}$ in the locality. The distribution, delivery, or transmission of the asset to the subscriber $160_{jk}$ may be carried out through a network, satellite, or cable connection such as IP, IP over ATM, Gigabit Ethernet, ATM, cable, xDSL, fiber optic, satellite, or cable. The distributor 420 may be implemented as a video server or a storage server. It may also include a queue to queue the asset packages that have been uploaded by the receiver 410 to prepare for delivery.

The storage 430 stores the asset package 360 that has been successfully received. It may include a network attached storage (NAS) device, high capacity (e.g., 20 GB) solid state cache memory, RAID, tape library storage, Integrated Drive Electronics (IDE), Advanced Technology (AT) Attachment (ATA), enhanced IDE, ultra-ATA, serial ATA (SATA), Small Computer Serial Interface (SCSI), serial attached SCSI (SAS), etc.

The deletion command generator 440 receives a deletion status from the MCMS 130 and deletes the asset package stored in the stager 418 according to the load status indicating when it is safe to do so. Typically, an asset package is deleted when it is no longer needed according to the schedule, such as when the time window is passed, or when it is uploaded to a suitable video server. The deletion may be performed on the files included in the asset package. It may also be performed by changing a status information associated with an item to a deleted status, such as the metadata information.

Figure 5:
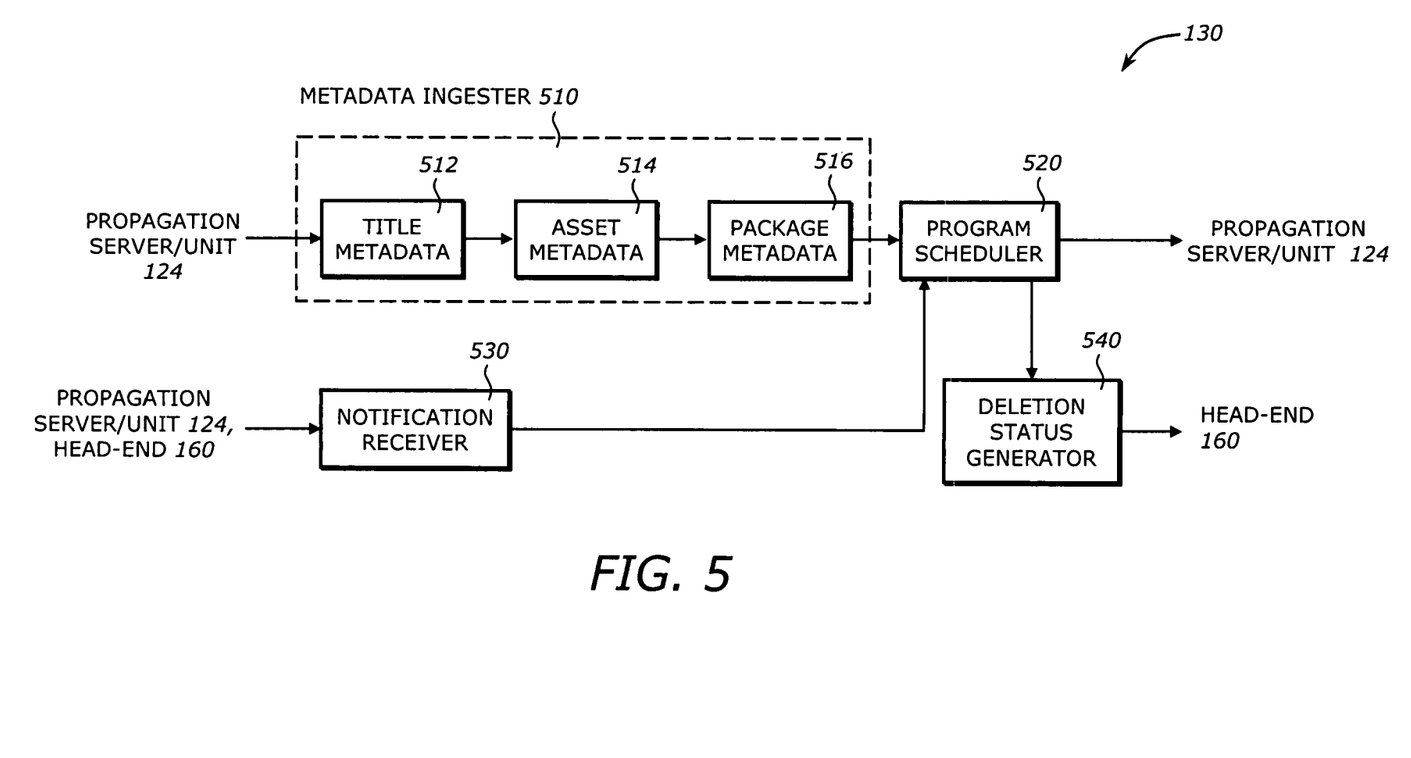
FIG. 5 is a diagram illustrating a media content management system according to one embodiment of the invention.

FIG. 5 is a diagram illustrating the MCMS 130 according to one embodiment of the invention. The MCMS 130 has a number of functionalities to support the management of the overall media distribution services. FIG. 5 only shows the elements that are relevant to the localized content management. The MCMS 130 includes a metadata ingester 510, a program scheduler 520, a notification receiver 530, and a deletion status generator 540.

The metadata ingester 510 performs metadata ingestion on the local content provided by the propagation server/unit 124. It may include a number of metadata functionalities such as ingest from external systems, authoring, validation, approval, localization, and publishing. It includes a title metadata ingester 512, an asset metadata ingester 514, and a package metadata ingester 516. The title metadata ingester 512 inputs the metadata associated with the title or identification of the local content. This may include the name, the title, the description, actors, director, credits, or any other identification information about the local content. This may be performed manually by the user or inserted programmatically by other Media Asset Management (MAM) systems. The asset metadata ingester 514 may input the metadata associated with the asset depending on the type of asset metadata. Asset metadata such as ID, file size, and file type, etc. may come from the propagation server/unit 124 via the asset registration process. Asset metadata such as close captioning, runtime, etc. may be input by user or come from other MAM systems. The package metadata ingester 516 inputs the metadata associated with the package of the local content such as price, category, etc. These metadata may be input manually by the user or programmatically from other MAM systems.

The program scheduler 520 schedules the local content for delivery. This may include generation of a time window, specific days of week when content is available, timeslots during a day, a location of the intended or requesting subscriber, and a delivery priority. It may also simply provide an instruction to the propagation server 124 of when to propagate the content. The program scheduler 520 then provides the schedule information including the delivery location information to the propagation server 124 together with the ingested metadata so that the propagation server 124 may continue the process of propagating the local content. The program scheduler 520 may also provide schedule information to the deletion status generator 540.

The notification receiver 530 receives notifications of transmission and/or reception of the asset package from the propagation server/unit 124 and/or the head-end 160. If any notification indicates that there is a problem or error in the transmission or reception, the MCMS 130 may coordinate or initiate a re-transmission or recovery of lost packages. The deletion status generator 540 generates a deletion status for an asset that has been delivered to the head-end 160 such as when the delivered asset is propagated to the content server.

Figure 6:
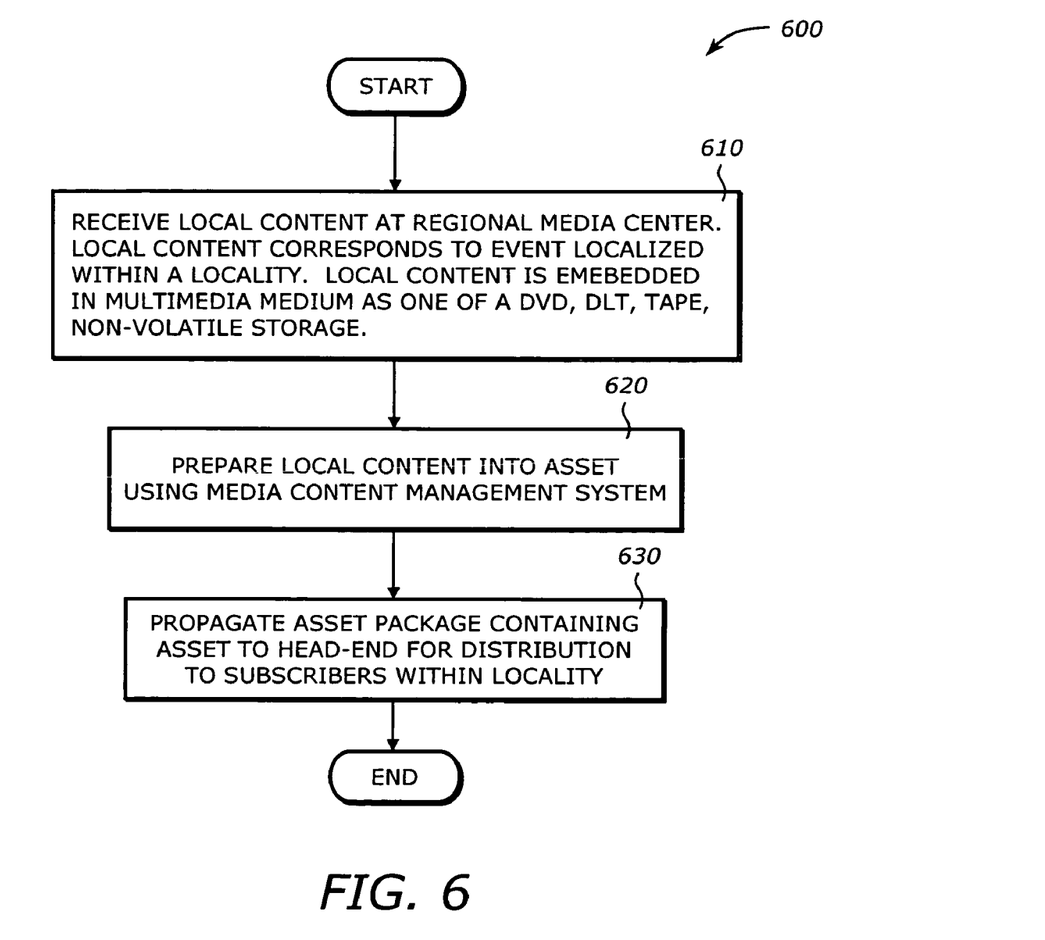
FIG. 6 is a flowchart illustrating a process to localize content management according to one embodiment of the invention.

FIG. 6 is a flowchart illustrating a process 600 to localize content management according to one embodiment of the invention.

Upon START, the process 600 receives a local content at a regional media center (Block 610). The local content corresponds to an event, activity, or service localized within a locality. The local content may be embedded in a multimedia medium as one of a DVD, a DLT, a tape, and a non-volatile storage. It may be in any suitable format, such as analog, digital, or optical format. It may also be partially or fully encoded or not encoded.

Next, the process 600 prepares the local content into an asset using a media content management system (Block 620). Then, the process 600 propagates an asset package containing the asset to a head-end for distribution to a subscriber within the locality (Block 630). The process 600 is then terminated.

Figure 7:
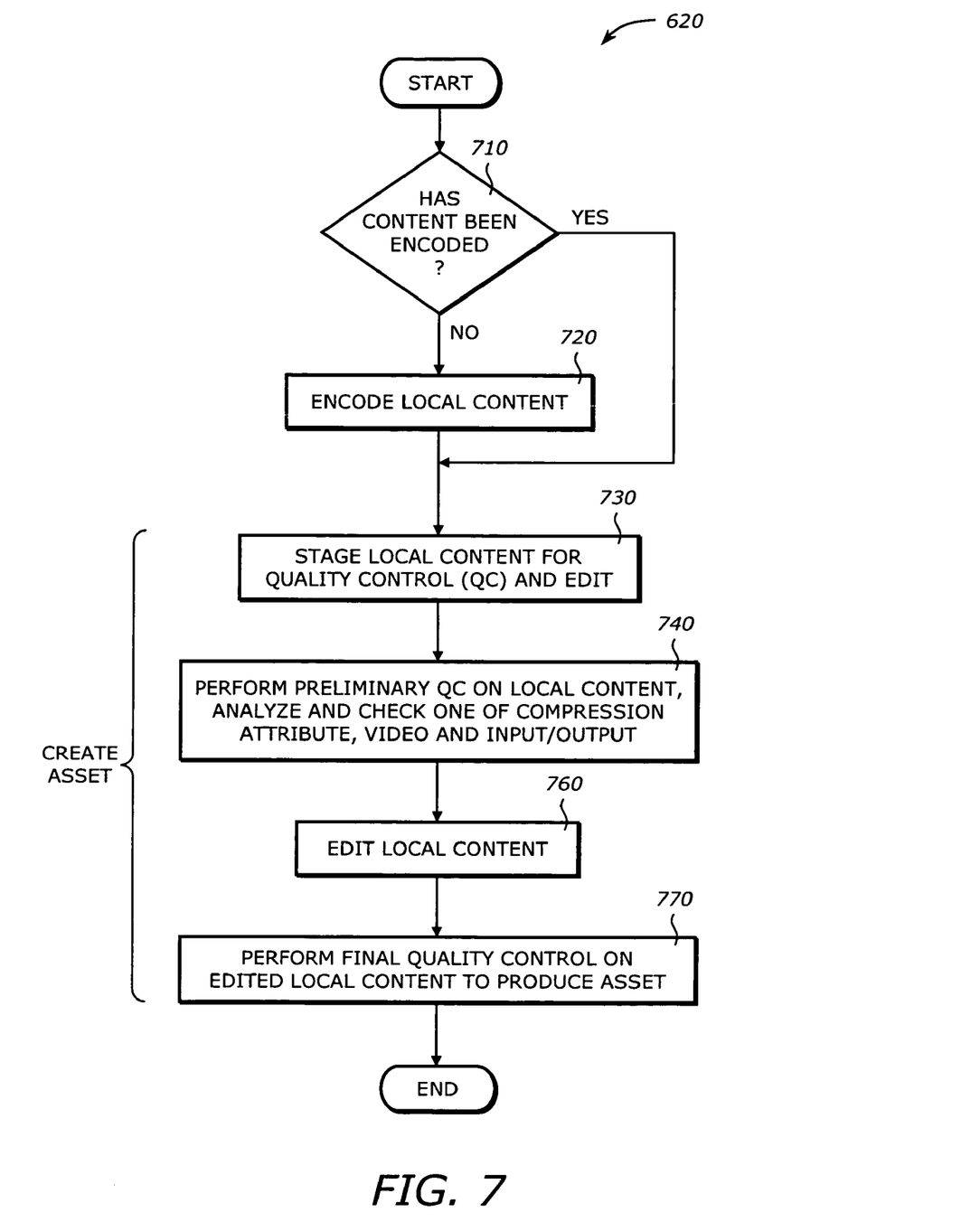
FIG. 7 is a flowchart illustrating a process to prepare a local content into an asset according to one embodiment of the invention.

FIG. 7 is a flowchart illustrating a process 620 to prepare a local content into an asset according to one embodiment of the invention.

Upon START, the process 620 determines if the local content has already been encoded (Block 710). If so, the process 620 proceeds to Block 730. Otherwise, the process 620 encodes the local content (Block 720). The encoding may include video and audio compressions and format encoding as describer above. Next, the process 620 starts creating the asset. First, the process 620 stages or prepares the local content for quality control (QC) and edit (Block 730). Then, the process 620 performs a preliminary QC on the local content (Block 740). This may be done by analyzing and checking at least one of the compression attribute, a video attribute, and an audio attribute. Then, the process 620 edits the local content (Block 760). The editing may include insertion of relevant information such as titles, descriptions, ratings, commercials, graphic overlays, or any other editing functions as described above. Next, the process 620 performs a final QC on the edited local content to produce the asset (Block 770) to ensure that the asset meets QC standards and is then terminated.

Figure 8:
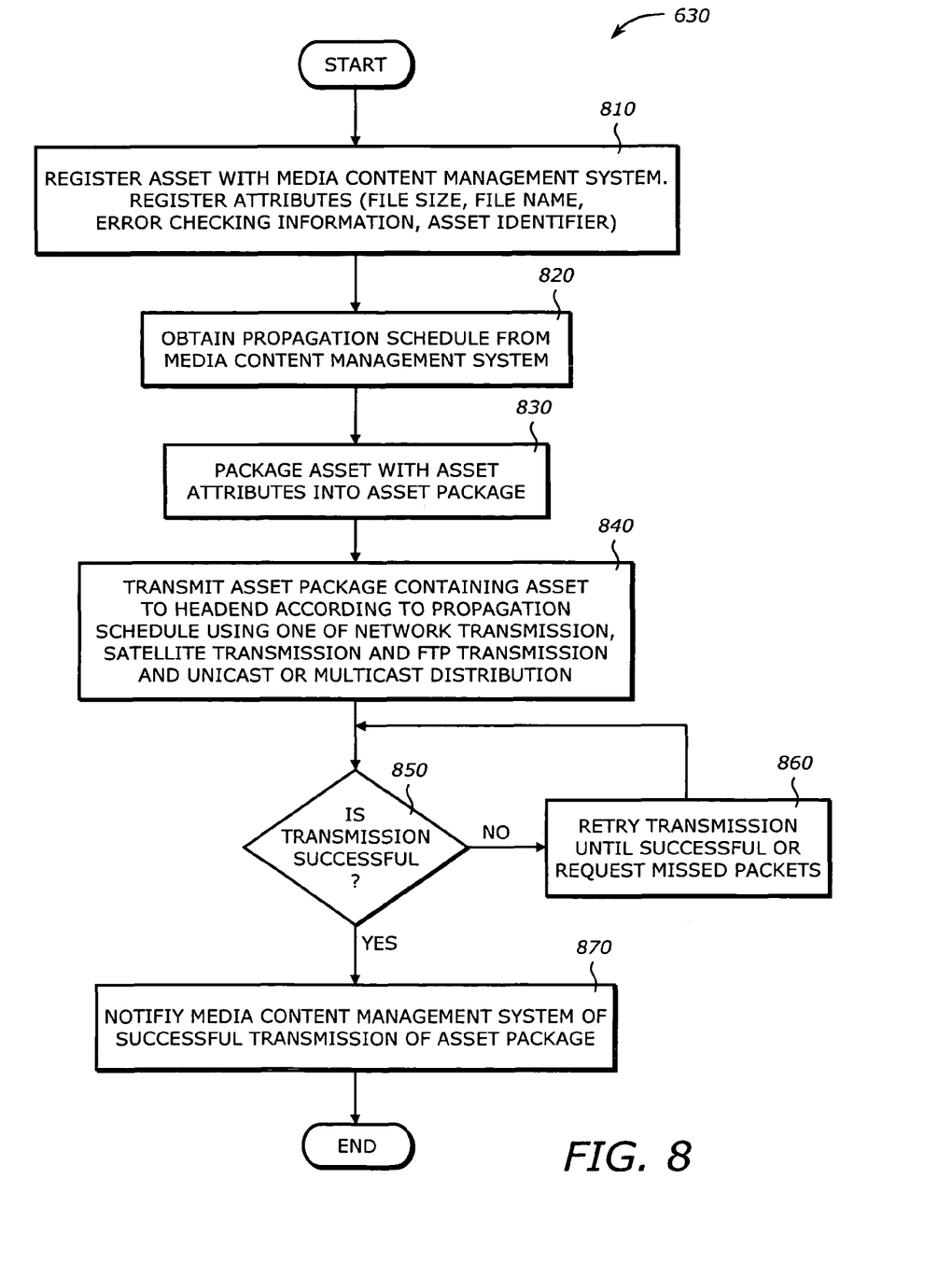
FIG. 8 is a flowchart illustrating a process to propagate an asset package according to one embodiment of the invention.

FIG. 8 is a flowchart illustrating a process to propagate an asset package according to one embodiment of the invention.

Upon START, the process 630 registers the asset with the media content management system (Block 810). This may be performed by registering the asset attributes with the media content management system. The asset attributes may include at least one of a file size, a file name, an error checking information (e.g., checksum), and an asset identifier. Next, the process 630 obtains a propagation schedule from the media content management system (Block 820).

Then, the process 630 packages the asset with asset attributes into an asset package (Block 830). This may include encryption by a suitable key if necessary. Next, the process 630 transmits the asset package containing the asset to a head-end according to the propagation schedule (Block 840). The transmission may be unicast (e.g., point-to-point) or multicast (e.g., point-to-multipoint). The transmission may be a network transmission (e.g., IP, IP over ATM, Gigabit Ethernet), a satellite transmission, a cable transmission, a file transfer protocol (FTP) transmission, or a MFTF transmission. Then, the process 630 determines if the transmission is successful (Block 850). If not, the process 630 retries the transmission or requests for the missed packets or packages and re-transmits the missed packets or packages until successful (Block 860) and returns to Block 850. If successful, the process 630 notifies the media content management system of the successful transmission of the asset package (Block 870) and is then terminated.

Figure 9:
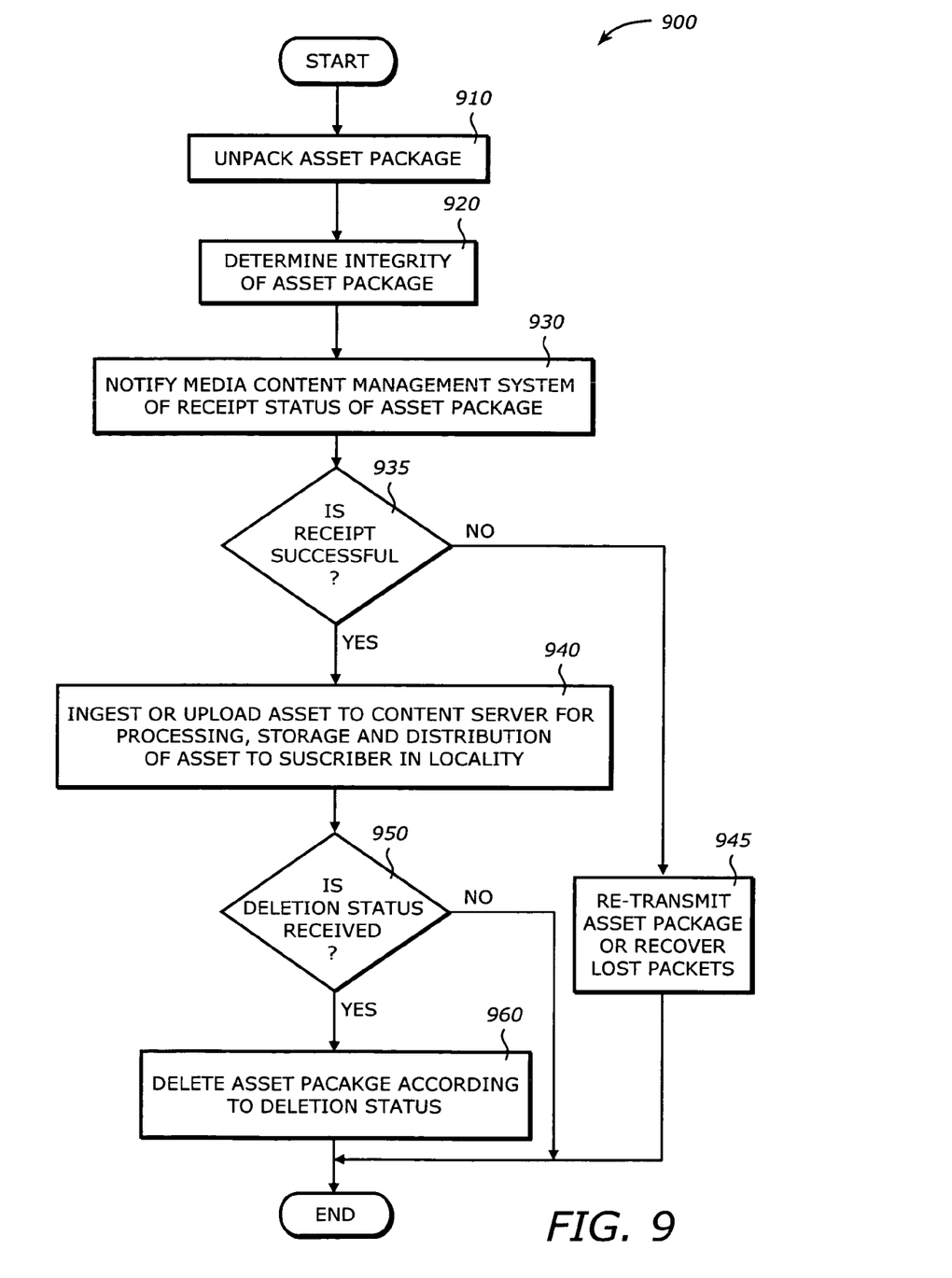
FIG. 9 is a flowchart illustrating a process to according to one embodiment of the invention.

FIG. 9 is a flowchart illustrating a process 900 to receive and distribute the asset package according to one embodiment of the invention.

Upon START, the process 900 unpacks the asset package (Block 910). This may also include decryption of the asset package using a suitable key. Next, the process 900 determines the integrity of the asset package (Block 920). This may be performed by checking the error checking information, and other attributes of the asset package. Then, the process 630 notifies a media content management system of a receipt status of the asset package (Block 930). Next, the process 630 determines if the receipt is successful (Block 935). If not, the process 630 re-transmits the asset package or recovers the lost packets or packages (Block 945) and is then terminated. If the receipt is successful, the process 630 stages the asset for ingestion into a content server for distribution of the asset to a subscriber in the locality (Block 940).

Then, the process 630 determines if a deletion status is received from the media content management system (Block 950). If not, the process 630 is terminated. Otherwise, the process 630 deletes the asset package according to the deletion status (Block 960) and is then terminated.

Figure 10:
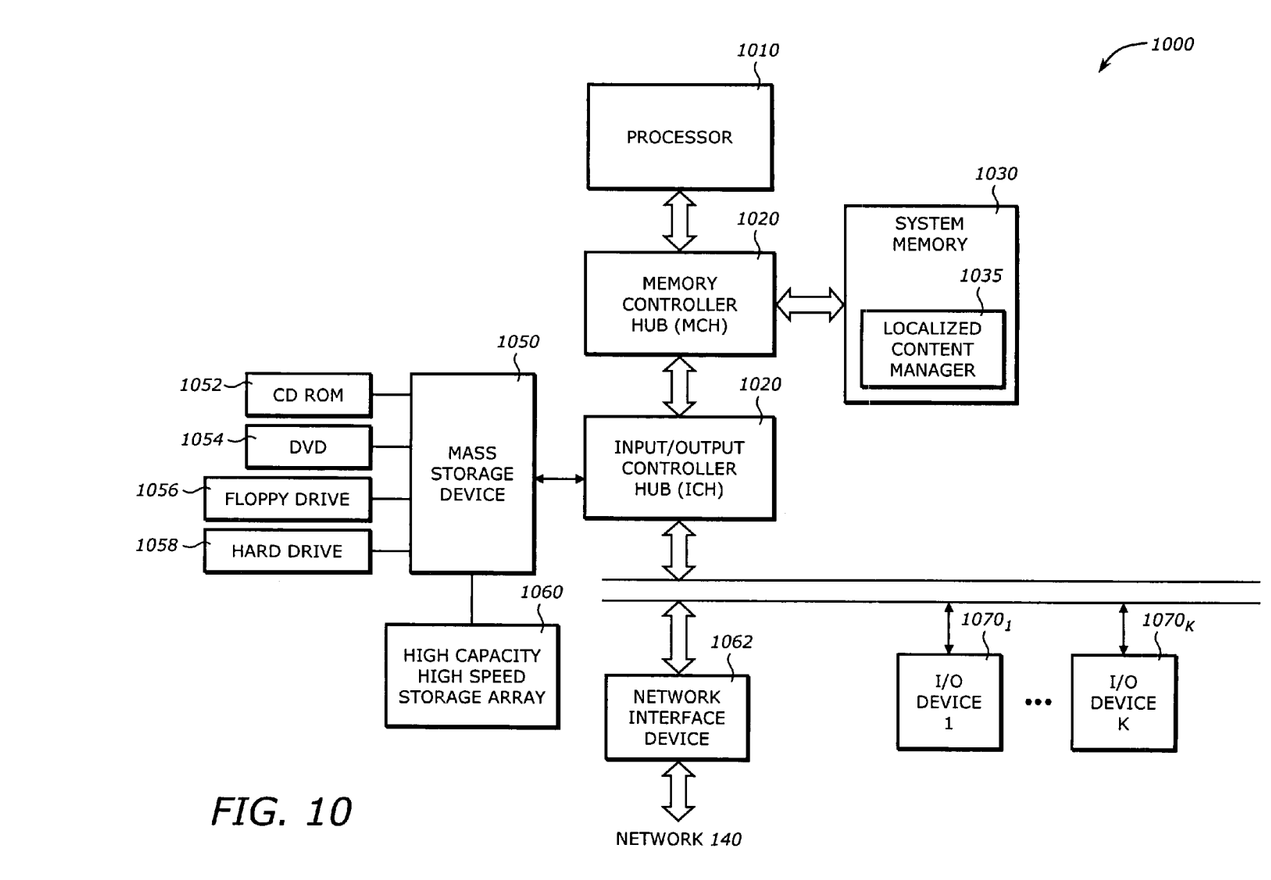
FIG. 10 is a diagram illustrating a server to according to one embodiment of the invention.

FIG. 10 is a diagram illustrating a server or unit 1000 according to one embodiment of the invention. The server or unit 1000 may represent the preparation server/unit 122, the propagation server/unit 124, the head-end 160, or any other computer processing unit used in the system 100 shown in FIG. 1. The server/unit 1000 includes a processor unit 1010, a memory controller hub (MCH) 1020, a main memory 1030, an input/output controller hub (ICH) 1040, a mass storage device 1050, a network interface device 1062, and input/output (I/O) devices $1070_1$ to $1070_K$. It is noted that the server 1000 may contain more or less components than the above.

The processor unit 1010 represents a central processing unit of any type of architecture, such as processors using hyper threading, security, network, digital media technologies, single-core processors, multi-core processors, embedded processors, mobile processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture.

The MCH 1020 provides control and configuration of memory and input/output devices such as the main memory 1030 and the ICH 1040. The MCH 1020 may be integrated into a chipset that integrates multiple functionalities such as graphics, media, host-to-peripheral bus interface, memory control, power management, etc. The MCH 1020 or the memory controller functionality in the MCH 1020 may be integrated in the processor unit 1010.

The main memory 1030 stores system code and data. The main memory 1030 is typically implemented with dynamic random access memory (DRAM), static random access memory (SRAM), or any other types of memories including those that do not need to be refreshed. The main memory 1030 may include a localized content manager 1035. The localized content manager 1035 may include instructions and/or data that perform any one of the tasks described above.

The ICH 1040 has a number of functionalities that are designed to support I/O functions. The ICH 1040 may also be integrated into a chipset together or separate from the MCH 1020 to perform I/O functions. The ICH 1040 may include a number of interface and I/O functions such as peripheral component interconnect (PCI) bus interface, processor interface, interrupt controller, direct memory access (DMA) controller, power management logic, timer, system management bus (SMBus), universal serial bus (USB) interface, mass storage interface, low pin count (LPC) interface, etc.

The mass storage device 1050 stores archive information such as code, programs, files, data, and applications. The mass storage device 1050 may include compact disk (CD) read-only memory (ROM) 1052, digital video/versatile disc (DVD) 1054, floppy drive 1056, and hard drive 1058, and any other magnetic or optic storage devices. The mass storage device 1050 provides a mechanism to read machine-accessible media embedded in an article of manufacture. The machine-accessible media may include data that, when accessed by a machine, cause the machine to perform any one of the tasks or operations described above. In addition, the mass storage device 1050 may include high-capacity high speed storage arrays 1060 to store local contents and asset packages, such as RAIDs, NAS, digital tapes, optical storage, etc.

The network interface device 1062 provides interface to the network 140 (FIG. 1), or any other wired or wireless interconnecting medium to communicate with other units or servers. It may be any suitable network interface card (NIC) or satellite receiver card. It may also provide interfaces to ATM, SONET, Gigabit Ethernet, cable network, satellite, etc.

The I/O devices $1070_1$ to $1070_K$ may include any I/O devices to perform I/O functions. Examples of I/O devices $1070_1$ to $1070_K$ include controller for input devices (e.g., keyboard, mouse, trackball, pointing device), media card (e.g., audio, video, graphics), and any other peripheral controllers.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
    receiving a local content embedded in a multimedia medium at a regional media center, the local content corresponding to an event localized within a locality, the locality being a geographical region served by a multiple services/systems operator (MSO);
    preparing the local content into an asset using a media content management system, the asset being a digital file containing information or data used in processing and management including at least one of graphic overlays and editing functions, the media content management system providing metadata ingestion to the local content and delivery schedule, the metadata ingestion ingesting at least one of title metadata, asset metadata, and package metadata, the title metadata describing title or identification of the local content, the asset metadata describing type of asset, the package metadata describing at least one of price and category; and
    propagating an asset package containing the asset to a head-end, the head-end distributing the asset to a subscriber in the locality;
    wherein preparing the local content comprises:
    encoding the local content; and
    creating the asset from the local content; and
    wherein creating the asset comprises:
    staging the local content for quality control (QC) and edit;
    performing a preliminary QC on the local content, the preliminary QC including analysis and check of a media quality of the local content, the media quality including at least one of a compression attribute, a video attribute, and an audio attribute;
    editing the local content; and
    performing a final QC on the edited local content to produce the asset.

2. The method of claim 1 wherein receiving the local content comprises:
    receiving the local content embedded in the multimedia medium, the multimedia medium being one of a digital versatile disk (DVD), a digital linear tape (DLT), a tape, and a non-volatile storage.

3. The method of claim 1 wherein propagating the asset package comprises:
    registering the asset with the media content management system;
    obtaining a propagation schedule from the media content management system;
    packaging the asset with asset attributes into the asset package;
    transmitting the asset package containing the asset to the head-end according to the propagation schedule; and
    notifying the media content management system of a transmission status of the asset package.

4. The method of claim 3 wherein registering the asset comprises:
    staging the asset; and
    registering the asset attributes with the media content management system, the asset attributes including at least one of a file size, a file name, an error checking information, and an asset identifier.

5. The method of claim 3 wherein transmitting comprises:
    transmitting the asset package via one of a network transmission, a satellite transmission, and a file transfer protocol (FTP) transmission.

6. The method of claim 1 wherein encoding comprises performing at least one of Dolby Audio Compression (AC)-3 audio encoding; generating Motion Picture Experts Group (MPEG)-2, MPEG-4 files, Trick Play files for Fast Forward and Rewind, Playback functions, or pre-mastering; or generating Extensible Markup Language (XML)-based automation interface.

7. The method of claim 1 wherein creating the asset comprises inserting at least one of advertisements, overlays, or effects into a digital file corresponding to the asset.

8. The method of claim 1 wherein editing comprises at least one of:
generating at least one of titles, description, annotations, or texts;
inserting advertisements or commercials;
trimming;
performing three-dimensional (3-D) graphic animation; or
performing editing functions including at least one of deletions, cuts, dissolves, transitions, or video and audio effects.

9. The method of claim 1 further comprising:
receiving the asset package; and
ingesting the asset into a content server, the content server distributing the asset to a subscriber in the locality.

10. The method of claim 9 wherein receiving the asset package comprises:
unpacking the asset package;
determining integrity of the asset package;
notifying the media content management system of a receipt status of the asset package; and
staging the asset package for ingestion into the content server.

11. The method of claim 10 further comprising:
receiving a deletion status from the media content management system; and deleting the asset package according to the deletion status.

12. An article of manufacture comprising:
a machine-accessible storage medium including data that, when accessed by a machine, cause the machine to perform operations comprising:
receiving a local content embedded in a multimedia medium at a regional media center, the local content corresponding to an event localized within a locality, the locality being a geographical region served by a multiple services/systems operator (MSO);
preparing the local content into an asset using a media content management system, the asset being a digital file containing information or data used in processing and management including at least one of graphic overlays and editing functions, the media content management system providing metadata ingestion to the local content and delivery schedule, the metadata ingestion ingesting at least one of title metadata, asset metadata, and package metadata, the title metadata describing title or identification of the local content, the asset metadata describing type of asset, the package metadata describing at least one of price and category; and
propagating an asset package containing the asset to a head-end, the head-end distributing the asset to a subscriber in the locality;
wherein the data causing the machine to perform preparing the local content comprises data that, when accessed by a machine, cause the machine to perform operations comprising:
encoding the local content; and
creating the asset from the local content; and
wherein the data causing the machine to perform creating the asset comprises data that, when accessed by a machine, cause the machine to perform operations comprising:
staging the local content for quality control (QC) and edit;
performing a preliminary QC on the local content, the preliminary QC including analysis and check of a media quality of the local content, the media quality including at least one of a compression attribute, a video attribute, and an audio attribute;
editing the local content; and
performing a final QC on the edited local content to produce the asset.

13. The article of manufacture of claim 12 wherein the data causing the machine to perform receiving the local content comprises data that, when accessed by a machine, cause the machine to perform operations comprising:
receiving the local content embedded in the multimedia medium, the multimedia medium being one of a digital versatile disk (DVD), a digital linear tape (DLT), a tape, and a non-volatile storage.

14. The article of manufacture of claim 12 wherein the data causing the machine to perform propagating the asset package comprises data that, when accessed by a machine, cause the machine to perform operations comprising:
registering the asset with the media content management system;
obtaining a propagation schedule from the media content management system;
packaging the asset with asset attributes into the asset package;
transmitting the asset package containing the asset to the head-end according to the propagation schedule; and
notifying the media content management system of a transmission status of the asset package.

15. The article of manufacture of claim 14 wherein the data causing the machine to perform registering the asset comprises data that, when accessed by a machine, cause the machine to perform operations comprising:
staging the asset; and
registering the asset attributes with the media content management system, the asset attributes including at least one of a file size, a file name, an error checking information, and an asset identifier.

16. The article of manufacture of claim 14 wherein the data causing the machine to perform transmitting comprises data that, when accessed by a machine, cause the machine to perform operations comprising:
transmitting the asset package via one of a network transmission, a satellite transmission and a file transfer protocol (FTP) transmission.

17. The article of manufacture of claim 12 wherein the data causing the machine to perform encoding comprises data that, when accessed by a machine, cause the machine to perform operations comprising: performing at least one of Dolby Audio Compression (AC)-3 audio encoding; generating Motion Picture Experts Group (MPEG)-2, MPEG-4 files, Trick Play files for Fast Forward and Rewind, Playback functions, or pre-mastering; or generating Extensible Markup Language (XML)-based automation interface.

18. The article of manufacture of claim 12 wherein the data causing the machine to perform creating the asset comprises data that, when accessed by a machine, cause the machine to perform operations comprising: inserting at least one of advertisements, overlays, or effects into a digital file corresponding to the asset.

19. The article of manufacture of claim 12 wherein the data causing the machine to perform editing comprises data that, when accessed by a machine, cause the machine to perform operations comprising at least one of:
generating at least one of titles, description, annotations, or texts;
inserting advertisements or commercials;
trimming;
performing three-dimensional (3-D) graphic animation; or
performing editing functions including at least one of deletions, cuts, dissolves, transitions, or video and audio effects.

20. The article of manufacture of claim 12 further comprising data that, when accessed by a machine, cause the machine to perform operations comprising:
    receiving the asset package; and
    ingesting the asset into a content server, the content server distributing the asset to a subscriber in the locality.

21. The article of manufacture of claim 20 wherein the data causing the machine to perform receiving the asset package comprises data that, when accessed by a machine, cause the machine to perform operations comprising:
    unpacking the asset package;
    determining integrity of the asset package;
    notifying the media content management system of a receipt status of the asset package; and
    staging the asset package for ingestion into the content server.

22. The article of manufacture of claim 21 further comprising data that, when accessed by a machine, cause the machine to perform operations comprising:
    receiving a deletion status from the media content management system; and
    deleting the asset package according to the deletion status.

23. A server unit comprising:
    a preparation unit to receive and prepare a local content embedded in a multimedia medium using a media content management system into an asset, the asset being a digital file containing information or data used in processing and management including at least one of graphic overlays and editing functions, the media content management system providing metadata ingestion to the local content and delivery schedule, the local content corresponding to an event localized within a locality, the locality being a geographical region served by a multiple services/systems operator (MSO), the metadata ingestion ingesting at least one of title metadata, asset metadata, and package metadata, the title metadata describing title or identification of the local content, the asset metadata describing type of asset, the package metadata describing at least one of price and category; and
    a propagation unit coupled to the preparation unit to propagate an asset package containing the asset to a head-end, the head-end distributing the asset to a subscriber in the locality;
    wherein the preparation unit comprises:
    an encoder to encode the local content; and
    an asset creator to create the asset from the local content; and
    wherein the asset creator comprises:
    a stager to stage the local content for quality control (QC) and edit;
    a preliminary quality controller to perform a preliminary QC on the local content, the preliminary QC including analysis and check of a media quality of the local content, the media quality including at least one of a compression attribute, a video attribute, and an audio attribute;
    an editor to edit the local content; and
    a final quality controller to perform a final QC on the edited local content to produce the asset.

24. The server unit of claim 23 wherein the multimedia is one of a digital versatile disk (DVD), a digital linear tape (DLT), a tape, and a non-volatile storage.

25. The server unit of claim 23 wherein the propagation server comprises:
    an asset register to register the asset with the media content management system;
    a schedule receiver to receive a propagation schedule from the media content management system;
    an asset packager to package the asset with asset attributes into the asset package;
    a transmitter to transmit the asset package containing the asset to the head-end according to the propagation schedule; and
    a notifier to notify the media content management system of a transmission status of the asset package.

26. The server unit of claim 25 wherein the asset register comprises:
    a stager to stage the asset; and
    an attribute register to register the asset attributes with the media content management system, the asset attributes including at least one of a file size, a file name, an error checking information, and an asset identifier.

27. The system of claim 25 wherein the transmitter transmits the packaged asset via one of a network transmission, a satellite transmission, and a file transfer protocol (FTP) transmission.

28. The server unit of claim 23 wherein the encoder performs at least one of Dolby Audio Compression (AC)-3 audio encoding; generating Motion Picture Experts Group (MPEG)-2, MPEG-4 files, Trick Play files for Fast Forward and Rewind, Playback functions, or pre-mastering; or generating Extensible Markup Language (XML)-based automation interface.

29. The server unit of claim 23 wherein the asset creator inserts at least one of advertisements, overlays, or effects into a digital file corresponding to the asset.

30. The server unit of claim 23 wherein the editor performs at least one of: generating at least one of titles, description, annotations, or texts; inserting advertisements or commercials; trimming; three-dimensional (3-D) graphic animation; or editing functions including at least one of deletions, cuts, dissolves, transitions, or video and audio effects.

* * * * *